United States Patent [19]
Liskowitz et al.

[11] Patent Number: 5,772,752
[45] Date of Patent: Jun. 30, 1998

[54] SULFATE AND ACID RESISTANT CONCRETE AND MORTAR

[75] Inventors: John W. Liskowitz, Belle Mead; Methi Wecharatana, Parsippany, both of N.J.; Chai Jaturapitakkul, Bangkok, Thailand; Anthony E. Cerkanowicz, deceased, late of Livingston, N.J., by Elizabeth M. Cerkanowicz, executrix

[73] Assignee: New Jersey Institute of Technology, Newark, N.J.

[21] Appl. No.: 737,665

[22] PCT Filed: May 19, 1995

[86] PCT No.: PCT/US95/06336

§ 371 Date: Nov. 20, 1996

§ 102(e) Date: Nov. 20, 1996

[87] PCT Pub. No.: WO95/32162

PCT Pub. Date: Nov. 30, 1995

Related U.S. Application Data

[63] Continuation-in-part of Ser. No. 246,861, May 20, 1994, abandoned.

[51] Int. Cl.$^6$ .............................. C04B 7/13; C04B 14/04
[52] U.S. Cl. ......................... 106/705; 106/737; 106/816; 106/DIG. 1; 106/819; 264/DIG. 49
[58] Field of Search .................................. 106/705, 709, 106/737, 738, 816, 819, DIG. 1, 405; 264/DIG. 49

[56] References Cited

U.S. PATENT DOCUMENTS

| | | |
|---|---|---|
| 2,250,107 | 7/1941 | Nelles . |
| 2,987,408 | 6/1961 | Minnick . |
| 3,669,703 | 6/1972 | Pennachetti et al. . |
| 3,698,924 | 10/1972 | Kalousek et al. . |
| 3,950,178 | 4/1976 | Jaklin . |
| 4,210,457 | 7/1980 | Dodson et al. . |
| 4,240,952 | 12/1980 | Hulbert, Jr. et al. . |
| 4,256,504 | 3/1981 | Dunstan, Jr. . |
| 4,282,036 | 8/1981 | Finsterwalder et al. . |
| 4,310,486 | 1/1982 | Cornwell et al. . |
| 4,640,715 | 2/1987 | Heitzmeann et al. . |
| 4,715,896 | 12/1987 | Berry . |
| 4,930,428 | 6/1990 | Schneider et al. . |
| 4,992,102 | 2/1991 | Barbour . |
| 5,084,102 | 1/1992 | Brouns et al. . |
| 5,110,362 | 5/1992 | Hoarty et al. . |
| 5,374,308 | 12/1994 | Kirkpatrick et al. . |
| 5,624,491 | 4/1997 | Liskowitz et al. ...................... 106/705 |

FOREIGN PATENT DOCUMENTS 618344 10/1994 European Pat. Off. .

OTHER PUBLICATIONS

Sheu et al., 1990, Mat. Res. Soc. Symp. Proc. 178:159–66 (No Month).

Stoltenberg–Hansson, 1989, Mat. Res. Soc. Symp. Proc. 136:175–84 (No Month).

Irasser and Batic, 1989, Cement and Concrete Research 19:194–202 (No Month).

Ukita et al., 1989, SP 114–10 in *Fly Ash, Silica Fume, Slag, and Natural Pozzolans in Concrete,* American Concrete Institute, Detroit, pp. 219–240 (No Month).

ACI Committee 226, 1987, "Use of Fly Ash in Concrete," ACI 226.3R–87, ACI Materials J. 84:381–409 (No Month).

Maselhuddin et al., 1987, ACI Mats. J. 84–M6:42–50 (No Month).

Aitcin et al., 1986, "Comparitive Study of the Cementitious Properties of Different Fly Ashes," in *Fly Ash, Silica Fume, Slag, and Natural Pozzolans in Concrete,* SP–91, American Concrete Institute, Detroit, pp. 91–114.

van der Sloot et al., 1985, "Physical and Chemical characterization of Pulverized–Coal ash with Respect to Cement––Based Applications", ECN–178, Netherlans Energy Research Foundation (No Month).

Jun–yuan et al., 1984, Cement and Concrete Research 14:505–12 (No Month).

Plowman and Harrogate, 1984, Proceedings 2nd Int'l Conference on Ash Technology and Marketing, London, pp. 437–443 (No Month).

Ravina, 1980, Cement and Concrete Res. 10:573–80. (Date Unknown).

Freeman et al. (1992) Proc. 48th Canmet/ACI Intl. Conference on the Use of Fly Ash. vol. 1, May 3, 1992, pp. 281–297 (No Month).

Sivasundaram et al. (1992) Chem Abst. 116:12269q (No Month).

Borrachero et al. (1994) Proc. Intl. Conf. Environ. Implic. Contruct. Mater. Tech. Dev., Jun. 1, 1994, pp. 563–570.

*Primary Examiner*—Michael Marcheschi
*Attorney, Agent, or Firm*—Klauber & Jackson

[57] ABSTRACT

The present invention relates to concrete, mortar and other hardenable mixtures comprising cement and fly ash for use in construction and other applications, which hardenable mixtures demonstrate significant levels of acid and sulfate resistance while maintaining acceptable compressive strength properties. The acid and sulfate hardenable mixtures of the invention containing fly ash comprise cementitious materials and a fine aggregate. The cementitous materials may comprise fly ash as well as cement. The fine aggregate may comprise fly ash as well as sand. The total amount of fly ash in the hardenable mixture ranges from about 60% to about 120% of the total amount of cement, by weight, whether the fly ash is included as a cementious material, fine aggregate, or an additive, or any combination of the foregoing. In specific examples, mortar containing 50% fly ash and 50% cement in cementitious materials demonstrated superior properties of corrosion resistance.

18 Claims, 5 Drawing Sheets

+ DRY25  ◇ WET25
△ 6F25  □ CF  × 16F25

△ 6F50  × 16F50
+ DRY50  ◇ WET50  □ CF

SULFATE AND ACID RESISTANT CONCRETE AND MORTAR

CONTINUING INFORMATION

This application is a National Phase entry of the PCT/US95/06336, filed May 19, 1995 which is a continuation-in-part of U.S. Ser. No. 08/246,861 filed May 20, 1994, and now abandoned.

The research leading to the present invention was conducted with Government support under Contract No. DE-FG22-90PC90299 awarded by the Department of Energy. The Government has certain rights in this invention.

FIELD OF THE INVENTION

The present invention relates to concrete, mortar and other hardenable mixtures comprising cement and fly ash for use in construction and other applications, which hardenable mixtures demonstrate significant levels of acid and sulfate resistance while maintaining acceptable compressive strength properties.

BACKGROUND OF THE INVENTION

Acid and Sulfate-Mediated Corrosion of Concrete and Mortar

Concrete and mortar contain calcium hydroxide ($Ca(OH)_2$), which readily reacts with acids or sulfates to form ettringite. This results in reduced strength of the concrete and mortar, which manifests as surface damage, and eventually leads to complete structural deterioration. Nowhere are these problems more acute than in our cities, where buildings and roadways slowly deteriorate under the assault of acid rain and other pollutants.

Corrosion of conventional concrete due to chemical attack of both concrete and the steel reinforcement costs an enormous amount of money annually for repairs and maintenance of structures. Sulfate and acid attack are a major problem with the durability of concrete. For pH values between 3 to 6, acid attack progresses at a rate proportional to the square root of time (Neville, 1983, *Properties of Concrete*, 3rd. Ed, Pitman Publishing Inc.: London). Severe damage to concrete pipes in sewer systems results from the action of the bacterium *Thiobacillus concreteavor*, especially in warm climates. Sulfur-reducing bacteria reduce the sulfate present in natural water to produce hydrogen sulfide as a waste product. Another group of bacteria takes the reduced sulfur and oxidizes it back to sulfuric acid (Thornton, 1978, ACI J. Proceedings 75:577-584). Thus attack from sulfuric acid occurs, gradually dissolving and deteriorating concrete surfaces. This process is commonly known as "crown corrosion" in sewage collection systems.

In cement formulations, one way to minimize damage from acid or sulfate attack is to reduce the amount of $C_3A$ (tricalcium aluminate, $3CaO \cdot Al_2O_3$) present in the concrete. Such sulfate resistant cement is known as standard portland cement type V. Type V portland cement specifies a $C_3A$ content of not more than 5%. Typically, however, the cost of standard portland cement type V is higher than standard portland cement type I.

Other strategies to increase the corrosion resistance of concrete, such as polymer concrete, are also extremely expensive. Unfortunately, the expense of making acid resistant concrete can outweigh the benefit to be gained from using such concrete.

Another possible way to increase acid resistance is to introduce fly ash into the concrete or mortar. Nasser and Lai (1990, *Proceedings of the First Materials Engineering Congress, Denver, Colorado*, pp. 688-97) and Irassar and Batic (1989, Cement and concrete Res. 19:194-202) reported that Class F fly ash was a good source of pozzolan, which could improve resistance of concrete to sulfate attack. The data on corrosion resistance of concrete samples monitored for more than three years indicated that concrete samples with 20% of cement replaced by fly ash protected the steel reinforcement bars from corrosion better than plain concrete (Maslehuddin et al, 1987, ACI J. Proceedings 84:42-50). The results of another study suggested that fly ash of finer particle size had greater resistance to sulfate attack (Sheu et al., 1990, *Symposium Proceedings, Fly Ash and Coal Conversion By-Products: Characterization, Utilization and Disposal VI*, Material Research Soc. 178:159-166).

However, the studies reported to date have not clearly revealed the degree of corrosion resistance or indicated the exact characteristics of cement or mortar containing fly ash. Partly, this was due to use of generic fly ash, which tends to be of uncertain quality from one lot to another. Without determining these characteristics, it is impossible to form any definite conclusions about the usefulness of concrete or mortar, much less risk using unpredictable materials on a construction project.

Fly Ash

Fly ash, a by-product of coal burning power plant, is produced worldwide in large quantities each year. In 1988, approximately 84 million tons of coal ash were produced in the U.S. in the form of fly ash (60.7%), bottom ash (16.7%), boiler slag (5.9%), and flue gas desulfurization (16.7%) (Tyson, 1990, Coal Combustion By-Product Utilization Seminar, Pittsburgh, 15 pp.). Out of the approximately 50 million tons of fly ash generated annually, only about 10 percent is used in concrete (ACI Committee 226, 1987, "Use of Fly Ash In Concrete," ACI 226.3R-87, ACI J. Proceedings 84:381-409). The remaining portion is mostly disposed of as waste in landfills.

It is generally more beneficial for a utility to sell its ash, even at low or subsidized prices, rather than to dispose of it in a landfill. Sales not only generate some income, but also, and more importantly, avoid the disposal cost. In the 1960's and 70's the cost of ash disposal was typically less than $1.00 per ton. However, due to the more stringent environmental regulations starting in the late 1970's, the cost of ash disposal has rapidly increased from $2.00 to $5.00 per ton and is still rising higher (Bahor and Golden, 1984, Proceedings, 2nd International Conference on Ash Technology and Marketing, London, pp. 133–136). The shortage of landfill due to environmental concerns has further escalated the disposal cost. The Environmental Protection Agency (EPA) estimated in 1987 that the total cost of waste disposal at coal fired power plants ranged from $11.00 to $20.00 per ton for fly ash and bottom ash (Courst, 1991, Proceedings: 9th Int'l Ash Use Symposium, 1:21-1 to 21-10).

This increasing trend of disposal cost has caused many concerns and researchers are urgently seeking means for better utilization of fly ash. One potential outlet for fly ash is incorporation in concrete or mortar mixtures.

Fly ash is used in concrete in two distinct ways, one as a replacement for cement and the other as a filler. The first use takes advantage of the pozzolan properties of fly ash, which, when it reacts with lime or calcium hydroxide, can enhance the strength of cementitious composites. However, fly ash is relatively inert and the increase in compressive strength can take up to 90 to 180 days to materialize. Also, since fly ash is just a by-product, the quality of fly ash has always been a major concern to the end users in the concrete industry.

Incorporation of fly ash in concrete improves workability and thereby reduces the water requirement with respect to the conventional concrete. This is most beneficial where concrete is pumped into place. Among numerous other beneficial effects are reduced bleeding, reduced segregation, reduced permeability, increased plasticity, lowered heat of hydration, and increases setting times (ACI Committee 226, 1987, supra). The slump is higher when fly ash is used (Ukita et al., 1989, SP-l 14, American Concrete Institute, Detroit, pp.219–240).

However, the use of fly ash in concrete has many drawbacks. For example, addition of fly ash to concrete results in a product with low air entrainment and low early strength development.

Thus, there is a need in the art for acid and sulfate resistant concrete and mortar.

There is a more urgent need for acid and sulfate resistant concrete and mortar at a reasonable cost, without sacrificing the rate of strength gain specifications required for construction.

There is a further need in the art to find economical uses for fly ash produced during combustion of coal.

These and other needs in the art are addressed by the instant invention.

The citation or identification of any reference in this application shall not be construed as an admission that such reference is available as prior art to the present invention.

SUMMARY OF THE INVENTION

The present invention is directed to a hardenable mixture containing fly ash with enhanced resistance to acid or sulfate attack. The hardenable mixture of the invention comprises cementitious materials and a fine aggregate, and may further comprise coarse aggregate. The cementitious materials may comprise fly ash as well as cement. The fine aggregate comprises sand, and may also comprise fly ash. The total amount of fly ash in the hardenable mixture ranges from about 60% to about 120% of the total amount of cement, by weight; preferably from about 70% to about 120%, and most preferably about 100%. According to the invention, the fly ash is fractionated by size or volume into fractions having a narrower range of particle sizes or volumes; preferably fractions having finer particle sizes or volumes are used.

Preferably, the mixtures of the invention are prepared with cementitious materials comprising from about 5% to about 35% fly ash, more preferably from about 10% to about 25% fly ash; and the fine aggregate comprising sand and fly ash, such that the total amount of fly ash present in the hardenable mixture is about 60% to about 120% of the total amount of cement in the cementitious materials in the mixture, by weight.

In a more preferred aspect of the invention, the fly ash has a fineness defined by a fineness modulus of less than about 600, wherein the fineness modulus is calculated as the sum of the percent of fly ash retained on sieves of 0, 1, 1.5, 2, 3, 5, 10, 20, 45, 75, 150, and 300 microns. More preferably, the fly ash is a finer fraction of fly ash having a fineness modulus of less than about 350. The role of fly ash fineness in compressive strength gain of hardenable mixtures is more fully elaborated in copending U.S. application Ser. No. 08/246,875, filed May 20, 1994, Attorney Docket No. 715-1-035, entitled "IMPROVED COMPRESSIVE STRENGTH OF CONCRETE AND MORTAR CONTAINING FLY ASH" by the same inventors as the inventors named herein, which is incorporated herein by reference in its entirety. Use of finer fractions of fly ash is critical to preparing hardenable mixtures that provide maximum protection from acid and sulfate attack, and demonstrate satisfactory compressive strength properties for use in construction or other applications.

In a further aspect, the total amount of fly ash present in the mixture is about 70% to about 110% of the total amount of cement in the cementitious materials in the mixture, by weight. Most preferably, the total amount of fly ash present in the mixture is about the same (100%) as the total amount of cement present in the cementitious materials in the mixture, by weight.

In one aspect, the hardenable mixture is concrete. For example, the invention is directed to a concrete comprising about 1 part by weight cementitious materials, about 1 to about 3 parts by weight fine aggregate, about 1 to about 5 parts by weight coarse aggregate, and about 0.28 to about 0.6 parts by weight water, wherein the cementitious materials may comprise fly ash as well as cement, wherein the total amount of fly ash in the mixture ranges from about 60% to about 120% of the total amount of cement. Preferably, the fly ash has a fineness as defined above.

In another aspect, the hardenable mixture is mortar. Accordingly, the invention is directed to a mortar comprising about 1 part by weight cementitious materials, about 1 to about 3 parts by weight fine aggregate, and about 0.28 to about 0.6 parts by weight water, wherein the cementitious materials may comprise fly ash as well as cement, wherein the total amount of fly ash in the mixture ranges from about 60% to about 120% of the total amount of cement. Preferably, the fly ash has a fineness as defined above.

The present invention contemplates achieving the goals of acid and sulfate resistance and maximum compressive strength with the greatest economy. In one aspect, the invention provides hardenable mixtures that contain fly ash, in particular concrete or mortar, with greater compressive strength than the equivalent cement or mortar composition, i.e., with the same amount of cement, lacking fly ash. This can be achieved by adding fly ash as an additive or fine aggregate substitute, or both, to a conventional mixture, without reducing the amount of cement. Thus, the pozzolanic activity of the fly ash will increase the strength of the hardenable mixture beyond that possible from the cement alone. Furthermore, the rate of strength gain will be very fast, since early strength gain is provided by cement, and later strength comes with pozzolanic activity of the fly ash. Preferably, the total amount of fly ash used as an additive is about equal to the total amount of cement, by weight. This embodiment of the invention is preferred for construction projects, where compressive strength gain is critical for maintaining a construction schedule, and where protection from corrosion is desirable. Although this embodiment of the invention costs more, for roughly the same price as conventional hardenable mixtures, e.g., mortar or concrete containing only cement, the present invention advantageously provides a much stronger product that is acid and sulfate resistant.

In another embodiment, a hardenable mixture containing fly ash that demonstrates the same rate of compressive strength gain as the same mixture without fly ash, but at a cost savings, can be prepared. The fly ash can be used as a partial replacement for cement in the cementitious materials, e.g., to replace from about 5% to about 35% of cement. In this embodiment, the degree to which fly ash can replace cement without decreasing the rate of compressive strength gain depends on the fineness of the fly ash; the greater the fineness of the fly ash, the greater the amount of fly ash that can be used to replace cement in the cementitious materials. More fly ash can be included as fine aggregate or an additive (although the fly ash has pozzolanic activity whether introduced as a cementitious material, a fine aggregate, or an additive). Preferably, the total amount of fly ash is equal to the total amount of cement.

In yet another embodiment, the invention provides for an inexpensive hardenable mixture, in which about 50% of the cement in cementitious materials is replaced with fly ash. Preferably the fly ash is of a high degree of fineness. Although the rate of compressive strength gain of this mixture would be much too slow for use in construction, after 180 days or so the compressive strength of such a mixture is about the same as a mixture without fly ash. Thus, concrete products, such as concrete sewer pipes, that do not require immediate use can be prepared very inexpensively.

In the best mode contemplated by the inventors for practicing the invention, fly ash is used as a replacement for 25% of the cement in cementitious materials in a hardenable mixture, e.g., concrete or mortar. More fly ash is used as an additive, or a replacement for fine aggregate, or both, so that the total amount of fly ash present in the hardenable mixture is about the same as the total amount of cement present in the hardenable mixture. Such a mixture provides all the advantages of acid and sulfate resistance conferred by the present invention, with satisfactory compressive strength properties.

Accordingly, it is an object of the present invention to provide hardenable mixtures that are highly acid and sulfate resistant, and that demonstrate greater compressive strength.

It is another object of the present invention to provide hardenable mixtures that are acid and sulfate resistant and less expensive, but which demonstrate the same properties of compressive strength.

It is yet another object of the present invention to provide hardenable mixtures that are acid and sulfate resistant, very inexpensive, and that achieve the required compressive strength.

Still another object of the invention is to utilize fly ash.

These and other objects of the present invention can be readily appreciated by reference to the following figures and detailed description of the invention.

DETAILED DESCRIPTION OF THE INVENTION

Figure 1A:
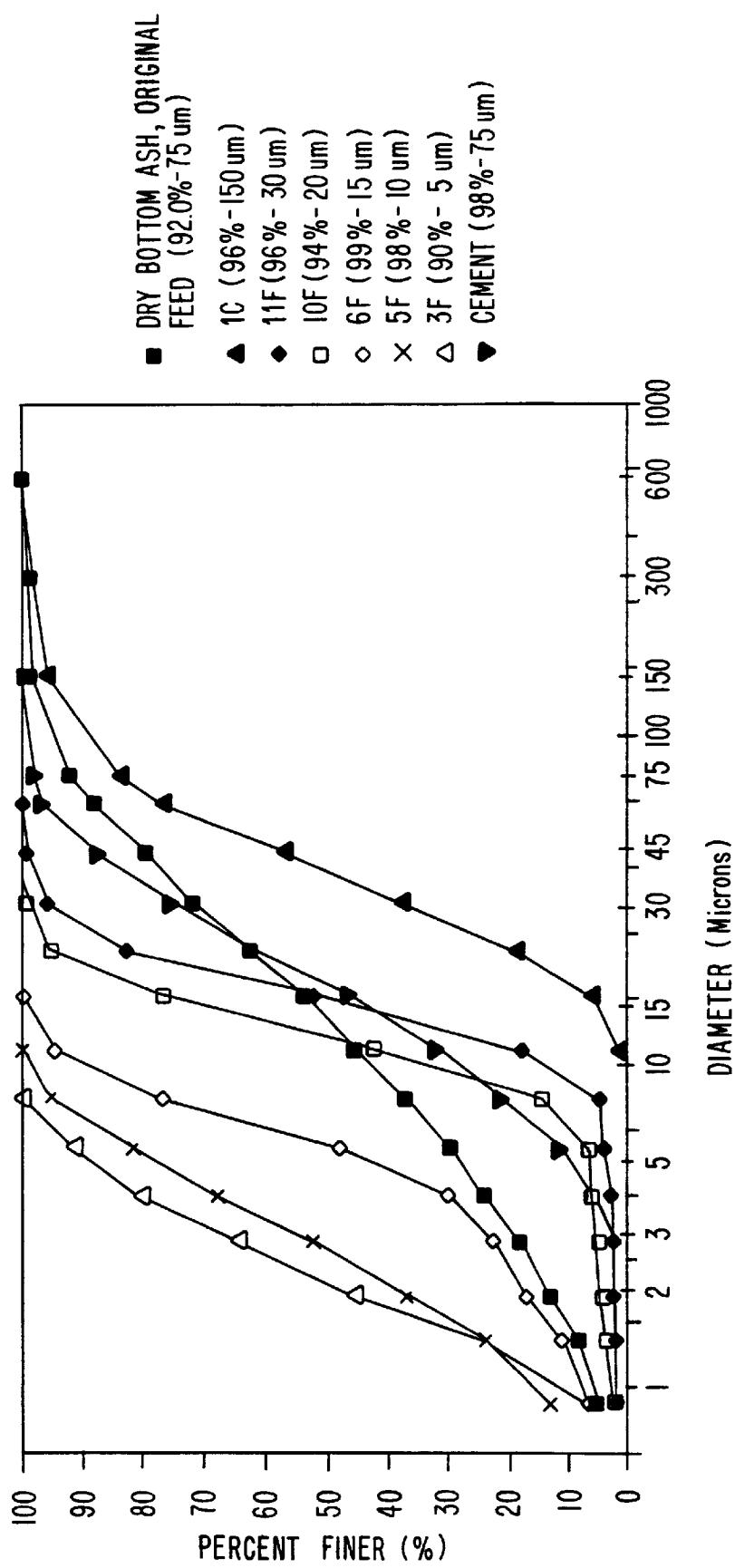
FIG. 1 presents graphs showing the size distribution of fractionated fly ash particles and cement particles (inverted triangles, 98% of which have a diameter of 75 $\mu$ or less). (A) Dry bottom boiler fly ash (solid square, in which 92% of the particles have a diameter of 75 $\mu$ or less) and fractions 1C (solid triangle, 95% less than 150 $\mu$), 11F (solid diamond, 96% less than 30 $\mu$), 10F (open square, 94% less than 20 $\mu$), 6F (open diamond, 99% less than 15 $\mu$), 5F (X, 98% less than 10 $\mu$), and 3F (open triangle, 90% less than 5 $\mu$). (B) Wet bottom boiler fly ash (open square, 95% less than 75 $\mu$) and fractions 18C (open triangle, 90.2% less than 75 $\mu$), 18F (X, 100% less than 30 $\mu$), 16F (open diamond, 99% less than 20 $\mu$), 15F (99% less than 15 $\mu$), 14F (solid diamond, 100% less than 10 $\mu$) and 13F (solid square, 93% less than 5 $\mu$). Fly ash from dry or wet bottom boilers was collected and fractionated into six different size distribution fractions as described in the Examples, infra.

As described above, the present invention relates to acid and sulfate resistant hardenable mixtures comprising fly ash. Preferably, the fly ash used is of a defined degree of fineness.

Throughout this specification, where specific ratios, percentages, or proportions are mentioned, they are determined by weight and not by volume.

The present invention is based, in part, on the observation that regardless of the source mand chemical composition of fly ash, the pozzolanic properties of the fly ash depend on the degree of fineness of the fly ash. It has been surprisingly found that fractionation of fly ash into fractions of a defined fineness modulus as herein defined provides a high degree of quality control, regardless of the classification or combustion conditions of the fly ash.

In specific embodiments, the corrosion resistance of fly ash mortar was investigated using fly ashes of well defined physical and chemical characteristics. Fly ash was introduced as a pozzolan into mortar to react with calcium hydroxide in the mortar, thus reducing the reactivity of the mortar with acid. Fly ash mortar specimens made of different percentages of fractionated fly ash, but containing a normal amount of cement, were immersed in a concentrated sulfuric acid bath to evaluate their resistance to acid attack. Strength and weight loss due to acid attack were monitored.

The invention is therefore based, in part, on the observation that mortar containing fly ash was much more resistant to degradation by a sulfuric acid bath. The optimum fly ash concentration for maximum acid resistance was found to be the same as the amount of cement, i.e., equal amounts of cement and fly ash in mortar gave maximum acid resistance. Similar results were obtained with concrete containing fly ash.

As used herein, the term "fly ash" refers to a solid material having a chemical composition similar to or the same as the composition of the material that is produced during the combustion of powdered coal. In a specific aspect, the solid material is the material remaining after the combustion of powdered coal. ACI Committee 116 (1990, ACI 116-85, *ACI*

*Manual of Concrete Practice Part I*, American Concrete Institute, Detroit) defines fly ash as "the finely divided residue resulting from the combustion of ground or powder coal which is transported form the firebox through the flue gases", and the term "fly ash" as used herein encompasses this definition. Generally, fly ash derived from various coals have differences in chemical composition, but the principal components of fly ash are $SiO_2$ (25% to 60%), $Al_2O_3$ (10% to 30%), and $Fe_2O_3$ (5% to 25%). The MgO content of fly ash is generally not greater than 5%. Thus, the term fly ash generally refers to solid powders comprising from about 25% to about 60% silica, from about 10% to about 30% $Al_2O_3$, from about 5% to about 25% $Fe_2O_3$, from about 0% to about 20% CaO, and from about 0% to about 5% MgO.

The term "fly ash" further contemplates synthetic fly ash, which may be prepared to have the same performance characteristics as fly ash as described herein.

Presently, fly ash is classified primarily in two groups: Class C and Class F, according to the ASTM C 618 (1990, supra). Class F is generally produced by burning anthracite or bituminous coal, and Class C results from sub-bituminous coal or lignite. Generally, the fly ash from the combustion of sub-bituminous coals contains more CaO and less $Fe_2O_3$ than fly ash from bituminous coal (Berry and Malhotra, 1980, ACI J. Proceedings 77:59-73). Thus, the CaO content of the Class C fly ash is usually higher than 10%, with the sum of the oxides of $SiO_2$, $Al_2O_3$ and $Fe_2O_3$ not less than 50%. For Class F fly ash the CaO content is normally less than 10% and the sum of the above mentioned oxides is not less than 70%.

The glassy phase of fly ash depends essentially on the combustion conditions and type of boiler. Non-fractionated fly ash obtained from different boilers, such as dry bottom boilers or wet bottom boilers, has been found to behave differently. Boilers that achieve higher temperature yield fly ash with a more developed or pronounced glassy phase.

Alternatively, combustion in the presence of a fluxing agent, which reduces the fusion temperature of the fly ash, can also increase the glassy phase of fly ash produced by combustion for lower temperature boilers. Compressive strength of a hardenable mixture containing fly ash may depend in part on the glassy phase of the fly ash, so generally fly ash produced for higher temperature boilers, or produced in the presence of a fluxing agent, or both, may be preferred. However, as demonstrated herein, the fineness modulus is the most important parameter for compressive strength, and fractionated fly ash from any source, with a defined fineness modulus, can be used according to the invention.

Although fly ash generally comes in a dry and finely divided form, in many instances, due to weathering and transportation processes, fly ash becomes wet and often forms lumps. Such fly ash can be less reactive unless the lumps can be dispersed into fine particles.

Pozzolan, as defined by ASTM C 593 (1990, ASTM C 593-89, *Annual Book of ASTM Standards*, Vol. 04.02), is "a siliceous or alumino-siliceous material that in itself possesses little or no cementitious value but that in finely divided form and in the presence of moisture will chemically react with alkali and alkaline earth hydroxides at ordinary temperatures to form or assist in forming compounds possessing cementitious properties."

The rate of compressive strength gain of containing concrete or mortar containing fly ash depends on the fineness modulus of fractionated fly ash. As used herein, the term "fineness modulus" refers to a measure of the distribution of volumes of particles of fly ash or distribution of particle sizes of the fly ash. According to the present invention, the fineness modulus is a distribution analysis that is much more informative than a median diameter determination or total surface area determination.

Preferably, the fineness modulus is determined as the sum of the percentage of fly ash remaining on each of a series of different sized sieves. Accordingly, the term "fineness modulus" refers to a relative value, which can vary depending on the series of sieves chosen. Since, according to the instant invention, fly ash particles of smaller size or diameter are preferred for use in hardenable mixtures, more accurate determinations of fineness modulus are available if a series of smaller sieves are chosen. Preferably, the size of the sieves is predominantly below 10 $\mu$, e.g., the sieves may be 0.5, 1, 2, 3, 4, 5, 6, 7, 8 and 10 microns. In this instance, the preferred fineness modulus will be a higher absolute number, reflective of the greater degree of accuracy of determination of this value for the smaller diameter or smaller size fly ash particles.

The pozzolanic reaction of fly ash in a hardenable mixture comprising cement is the reaction between constituents of the fly ash and calcium hydroxide. It is generally assumed to take place on the surface of fly ash particles, between silicates and aluminates from the glass phase of the fly ash and hydroxide ion in the pore solution (Plowman, 1984, Proceedings, 2nd Int'l Conference on Ash Technology and Marketing, London, pp. 437–443). However, as demonstrated in copending application Ser. No. 08/246,875, filed May 20, 1994, Attorney Docket No. 715-1-035, the pozzolanic reactions of fly ash are dependent on the volume of the fly ash particles: the smaller the particle volume, the more rapidly it completes its reaction with the cement to contribute to compressive strength. The rate of solubility and reactivity of these glassy phases in different types of fly ash depends on the glassy phase of fly ash, which in turn depends on the combustion temperature of the boiler that produced the fly ash. In addition to the effect of combustion conditions on the glassy phase of fly ash, different fly ashes from one class can behave differently, depending on the $SiO_2$, $Al_2O_3$ and $Fe_2O_3$ content, and other factors such as the particle size distribution and storage conditions of the ash (see Aitcin et al, 1986, "Comparitive Study of the Cementitious Properties of Different Fly Ashes," in *Fly Ash, Silica Fume, Slag, and Natural Pozzolans in Concrete*, SP-91, American Concrete Institute, Detroit, pp. 91-113; Liskowitz et al., 1983, *Final Report*, Vol. 1, U.S. Department of Energy, Morgantown Energy Technology Center, August, 211 pp.).

During hydration, portland cement produces a surfeit of lime (CaO) that is released to the pore spaces. It is the presence of this lime that allows the reaction between the silica components in fly ash and calcium hydroxide to form additional calcium silicate hydrate [C-S-H]. He et al. (1984, Cement and Concrete Research 14:505-511) showed that the content of crystalline calcium hydroxide in the fly ash-portland cement pastes decreases as a result of the addition of fly ash, most likely resulting from a reaction of calcium with alumina and silica from fly ash to form addition C-S-H. This process stabilizes the concrete, reduces permeability and increases resistance to chemical attacks.

Although not intending to be limited to any particular theory or hypothesis, it is believed that the ability of fly ash particles to locate in the pore spaces of a hardenable mixture such as concrete or mortar determines how effective the particles are in contributing to compressive strength or reacting with reactive components in cement. Thus, it is preferable to use finer fractions of fly ash, since the pore space is more accessible to particles having smaller volume. However, the invention contemplates optimizing the fineness of a fraction of fly ash for a particular application, and contemplates using fractions of fly ash having a range of values of fineness modulus.

Fractionation of fly ash can be accomplished by any means known in the art. Preferably, fractionation proceeds with an air classifying system. In a specific embodiment, infra, a MICRO-SIZER air classifying system was used to fractionate fly ash in six different particle size ranges. In another embodiment, the fly ash can be fractionated by sieving. For example, a 45 $\mu$ or smaller sieve can be used to select for particles of a defined maximum size. In a further embodiment, the fly ash can be ground to a desired size or fineness. This method can increase the yield of fly ash; preferably the grinding process yields acceptably uniform particles and does not introduce metallic or other impurities from the grinder.

The term "cement" as used herein refers to a powder comprising alumina, silica, lime, iron oxide and magnesia burned together in a kiln and finely pulverized, which upon mixing with water binds or unites other materials present in the mixture in a hard mixture. Thus, the hardenable mixtures of the invention include cement. Generally, the term cement refers to hydraulic cements such as, but not limited to, portland cement, in particular portland type I, II, III, IV and V cements.

As used herein, the term "cementitious materials" refers to the portion of a hardenable mixture that provides for binding or uniting the other materials present in the mixture, and thus includes cement and pozzolanic fly ash. Fly ash can comprise from about 5% to about 60% of the cementitious materials in a hardenable mixture of the invention; preferably, fly ash comprises from about 10% to about 25% of cementitious materials. The balance of cementitious materials will generally be cement, in particular portland cement. In a specific embodiment, infra, the hardenable mixtures of the invention comprises portland type I cement. It should be noted that where fly ash is used to replace less than 50% of cement as cementitious materials in a hardenable composition of the invention, additional fly ash can be included in the composition so that the amount of fly as is in the preferred range of about 100% of amount of cement.

In a specific embodiment, the fly ash makes up from about 10% to about 25% of the cementitious materials, and fly ash is used as fine aggregate in a ratio of from about 4:1 to about 1:1 to sand. Thus, in this embodiment, fly ash is an additive in addition to a replacement of cement, or a replacement of cement and fine aggregate, or both.

The term "concrete" refers to a hardenable mixture comprising cementitious materials; a fine aggregate, such as sand; a coarse aggregate, such as but not limited to crushed limestone or crushed basalt coarse aggregate; and water. Concrete of the invention further comprises fly ash having defined fineness; preferably the fly ash is fractionated. In specific embodiments, concrete of the invention comprises about 1 part by weight cementitious materials, about 1 to about 3 parts by weight fine aggregate, about 1 to about 5 parts by weight coarse aggregate, and about 0.28 to about 0.6 parts by weight water, such that the ratio of cementitious materials to water ranges from approximately 3:1 to 1.5:1; preferably, the ratio of cementitious materials to water is about 2.2:1. In a specific embodiment, the concrete comprises 1 part cementitious materials, 2 parts siliceous river sand or Ottawa sand, 3 parts 3/8" crushed basalt coarse aggregate, and 0.5 parts water.

The term "mortar" refers to a hardenable mixture comprising cementitious materials; a fine aggregate, such as sand and/or fly ash; and water. Mortar of the invention further comprises fly ash, preferably having defined fineness. In a further aspect, the fly ash is used as fine aggregate in a ratio of from about 4:1 to about 1:1 to sand. In yet a further embodiment, the fly ash is an additive in addition to a replacement of cement, or a replacement of cement and fine aggregate.

In specific embodiments, mortar of the invention comprises about 1 part by weight cementitious materials, about 1 to about 3 parts by weight fine aggregate, and about 0.28 to about 6.0 parts by weight water, such that the ratio of cementitious materials to water is approximately 3:1 to about 1.5:1. In a specific embodiment, the mortar comprises 1 part cementitious materials, 2.75 parts Ottawa sand, and 0.5 parts water.

As noted above, fly ash can be used as a fine aggregate in acid and sulfate resistant concrete or mortar, in addition to or in lieu of a replacement for cement. In either case, the fly ash pozzolanic activity will contribute to the cementitious properties of the mixture. It has been found that substituting fly ash for a conventional fine aggregate, such as sand, provides the advantages of acid and sulfate resistance with increased compressive strength of the concrete or mortar. When fly ash is used as a partial replacement for cement, and added as a fine aggregate, the resulting hardenable mixture can have compressive strength properties comparable to or greater than cement alone because of the pozzolanic activity of the fly ash. When fly ash is used solely as an additive, hardenable mixtures with greatly increase compressive strength properties result. According to the invention, preferably finer fractions of fly ash are used.

According to the present invention, the hardenable mixture can further comprise one or more of the following: glass fiber; silica fume, which is a by-product from the silicon metal industry usually consisting of about 96%–98% reactive $SiO_2$, and which generally comes in very fine particle sizes of less than 1 micron; and superplasticizer, an expensive but common additive for concrete used to decrease the water requirement for mixing the concrete, such as DARACEM®-100 (W. R. Grace).

Addition of silica fume can enhance the early rate of strength gain of a hardenable mixture, and therefore may be a desirable component of hardenable mixtures of the invention. The silica fume, which is reactive, can also tie up acid and sulfate reactive materials in the cement.

In a specific embodiment, a hardenable mixture of the invention may also contain glass fibers for reinforcement. The use of glass fibers in hardenable mixtures of the invention for reinforcement can be achieved because the fly ash, particularly finer fractions of fly ash, reacts more readily than glass fibers with reactive components of the cement, e.g., $Ca(OH)_2$, thus preventing long term reaction of the glass fibers with these reactive components, which would otherwise degrade the glass fibers. Thus, the present invention advantageously provides for acid and sulfate resistant concrete and mortar that has significantly enhanced tensile strength because glass fibers can also be protected. As discussed above, the most inert hardenable mixtures result are those that contain approximately equal amounts of fly ash, or fly ash and silica fume (as discussed below), and cement.

In another specific embodiment, a hardenable mixture of the invention further comprises glass fibers, and silica fume. Silica fume reacts more readily with reactive components of cement than the glass fibers, and thus can provide early desirable protection of the glass fibers from degradation as well as early compressive strength gains. Subsequently, the fly ash will react with such reactive components of the cement, thus precluding early and late reactivity of glass fibers. As noted above, reaction of glass fibers with alkali and alkali earth compounds can lead to degradation of the glass fibers, and loss of tensile strength of the hardenable mixture.

Concrete beams of the invention with dimensions of 3"×6"×27" can be used to evaluate the bending strength of fly ash concrete, e.g., using simple beam with third-point loading. Preferably, such test procedures are in accordance with ASTM C 78 (1990, ASTM C 78–84, *Annual Book of ASTM Standards*, Vol 04.02).

Chemical Composition

Chemical Composition of Fractionated Fly Ashes

The chemical composition of fractionated fly ashes are shown in Table 1. Sample CEM is the cement sample used in this study. Samples DRY and WET are the fly ashes from the non-fractionated dry and wet bottom boiler ashes, respectively. 3F is the finest fly ash sample of the dry bottom ash and 13F is the finest sample of the wet bottom ash. The coarsest fly ashes samples of dry and wet bottom ash are 1C and 18C, respectively.

Both wet and dry bottom fly ashes used herein were classified as Class F fly ash according to ASTM C418 (1990, supra). Most of the fractionated fly ashes varied slightly in the oxide composition with changes in particle size. It has been reported that separation of Class F (high calcium) fly ash into size fractions does not result in significant chemical, morphological or mineralogical specification between particles (Hemming and Berry, 1986, Symposium Proceedings, Fly Ash and Coal Conversion By-Products: Characterization, Utilization and Disposal II, Material Research Society 65:91-130). The $SiO_2$ content tends to be lower when the particle size is larger. Differences in chemical compositions of the two fly ashes were observed in the $SiO_2$, $Fe_2O_3$, and CaO contents. Samples of the dry bottom fly ash were about 10% richer in $SiO_2$ than the wet bottom fly ash. The CaO content of the dry bottom fly ash varied from 1.90% to 2.99%, while for wet bottom fly ash, the CaO varied from 6.55% to 7.38%. $Fe_2O_3$ content of wet bottom fly ash was about twice as high in wet bottom than dry bottom fly ash. The highest concentration of $FeO_3$ of each type of fly ashes was observed in the coarsest particle sizes, i.e., 1C and 18C. Chemical composition of the fly ashes is shown in Table 1.

TABLE 1

Chemical Composition of Fractionated Fly Ashes and Cement

Chemical Composition (%)

| Sam | LOI | $SO_3$ | $SiO_2$ | $Al_2O_2$ | $Fe_2O_3$ | CaO | $K_2O$ | MgO | $Na_2O$ |
|---|---|---|---|---|---|---|---|---|---|
| CEM | 0.73 | 2.53 | 20.07 | 8.84 | 1.41 | 60.14 | 0.86 | 2.49 | 0.28 |
| 3F0 | 4.97 | 1.69 | 49.89 | 26.94 | 5.43 | 2.99 | 1.76 | 0.99 | 0.33 |
| 5F | 4.10 | 1.53 | 50.27 | 26.74 | 5.30 | 2.95 | 1.74 | 0.93 | 0.33 |
| 6F | 3.12 | 1.09 | 51.40 | 26.54 | 4.91 | 2.72 | 1.71 | 0.74 | 0.31 |
| 10F | 2.52 | 0.72 | 51.98 | 26.23 | 4.44 | 2.28 | 1.60 | 0.54 | 0.29 |
| 11F | 2.04 | 0.53 | 51.27 | 26.28 | 4.42 | 2.02 | 1.55 | 0.49 | 0.26 |
| 1C | 1.46 | 0.39 | 53.01 | 26.50 | 5.66 | 1.90 | 1.61 | 0.56 | 0.24 |
| DRY | 2.75 | 0.98 | 52.25 | 26.72 | 5.43 | 2.41 | 1.67 | 0.69 | 0.28 |
| 13F | 2.67 | 3.81 | 38.93 | 24.91 | 12.89 | 6.85 | 2.10 | 1.55 | 1.31 |
| 14F | 1.94 | 3.47 | 39.72 | 25.08 | 13.02 | 6.71 | 2.11 | 1.50 | 1.31 |
| 15F | 1.88 | 3.33 | 40.25 | 25.02 | 13.12 | 6.60 | 2.11 | 1.47 | 1.30 |
| 16F | 2.06 | 3.05 | 40.65 | 24.92 | 13.26 | 6.55 | 2.09 | 1.41 | 1.26 |
| 18F | 1.94 | 2.94 | 41.56 | 24.47 | 14.21 | 6.58 | 2.01 | 1.40 | 1.17 |
| 18C | 2.55 | 2.40 | 43.25 | 23.31 | 17.19 | 7.38 | 2.00 | 1.30 | 0.88 |
| WET | 2.05 | 3.13 | 41.54 | 24.74 | 14.83 | 6.89 | 2.07 | 1.43 | 1.17 |

It is interesting to note that after fly ash was fractionated into different sizes, loss of ignition (LOI) of the finest particle was higher than for larger particles. In other words, the LOI content gradually decreased as the particle size increased. Ravina (1980, Cement and Concrete Research 10:573-80) also reported that the finest particle of fly ashes has the highest LOI values. Ukita et al. (1989, Fly Ash, Silica Fume, Slag, and Natural Pozzolans In Concrete, SP-114, American Concrete Institute, Detroit, pp. 219-40) also showed that although chemical composition did not change when the median diameter of fly ash decreased from 17.6 microns to 3.3 microns, LOI increased from 2.78 to 4.37.

Our observations and these prior reports conflict with the report of ACI Committee 226 (1987, "Use of Fly Ash In Concrete," ACI 226.3R-87, ACI J. Proceedings 84:381-409) and of Sheu et al. (1990, Symposium Proceedings, Fly Ash and Coal Conversion By-Products: Characterization, Utilization and Disposal VI, Materials Research Society 178:159-166), which state that the coarse fraction of fly ash usually has a higher LOI than the fine fraction.

Particle Size Analysis of Fractionated Fly Ashes

Figure 1B:
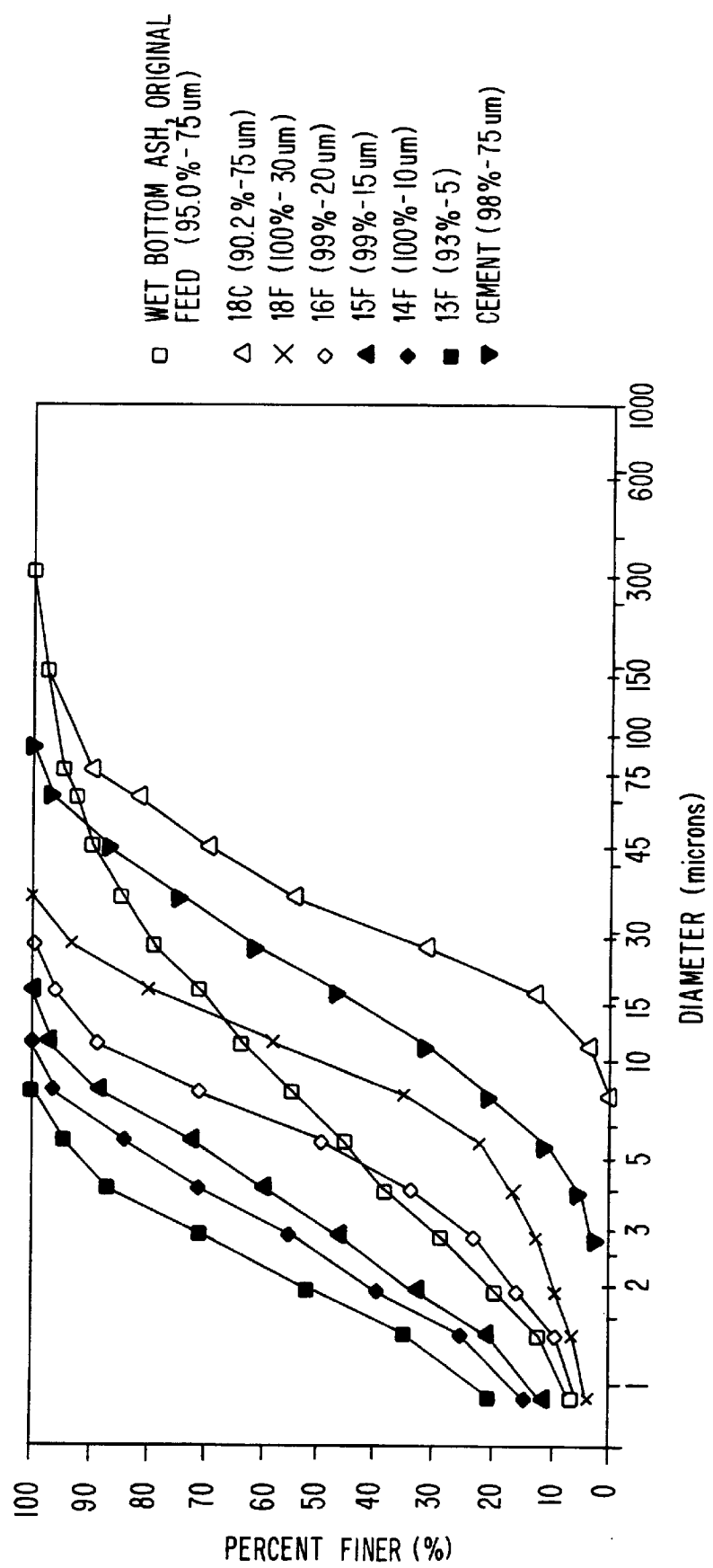

The particle size distributions of fractionated fly ashes from the dry and wet bottom boilers are shown in FIGS. 1A and 1B, respectively. The curves for the original feed fly ashes are not as steep as others since the non-fractionated original feed ash includes the entire range of sizes, and thus a wider range of size distributions than fractionated samples.

The percentage of fly ash in each fraction having a size less than a particular size is indicated in parentheses in each curve. For example, in case of the 3F fly ash, the finest of dry bottom fly ash, 3F (90%-5 $\mu$m) means that 90% of the fly ash particles are smaller than 5 microns.

From the original feed, each type of fly ash was fractionated into six ranges. As shown in FIGS. 1A and 1B, the particle size of fly ash varied from 0–5.5 micron to 0–600 microns. The median diameters of 3F and 13F were 2.11 and 1.84 microns, respectively, while the median diameters of the coarsest particle size, 1C and 18C, were 39.45 and 29.23 microns, respectively. For wet bottom fly ash, 13F was the finest fraction and 18C was the coarsest.

The non-fractionated wet bottom fly ash was found to be finer than the non-fractionated dry bottom fly ash. The particle sizes of non-fractionated dry bottom fly ash varied from about 1 micron to 600 microns, with a median particle diameter of 13.73 microns. The non-fractionated wet bottom fly ash included particles up to 300 microns with a median diameter of 6.41 microns. Particles from the smaller size fractions tended to have a more spherical shapes (Hemming and Berry, 1986, supra).

Fineness of Fractionated Fly Ash

Traditional values of fineness of fly ashes were determined both by wet sieve analysis and by the Blaine fineness together with the specific gravity of fly ashes, which are shown in Table 1. Median diameter, the diameter of which 50 percent of particles are larger than this size, is also presented in this table. According to ASTM C-618 (1990, supra), specifications, fractionated 1C fly ash is unacceptable for use in concrete since the percentage of the fly ash retained on sieve No. 325 is higher than 34%.

TABLE 2

Fineness of Cement and Fractionated Fly Ashes

| Sample No. | Specific Gravity (g/cm$^3$) | Fineness: Retained 45 $\mu$m (%) | Fineness: Blaine (cm$^2$/g) | Median Diameter ($\mu$m) |
| --- | --- | --- | --- | --- |
| CEM | 3.12 | — | 3815 | — |
| 3F | 2.54 | 0 | 7844 | 2.11 |
| 5F | 2.53 | 0 | 6919 | 2.66 |
| 6F | 2.49 | 0 | 4478 | 5.66 |
| 10F | 2.42 | 0 | 2028 | 12.12 |
| 11F | 2.40 | 1.0 | 1744 | 15.69 |
| 1C | 2.28 | 42.0 | 1079 | 39.45 |
| DRY | 2.34 | 20.0 | 3235 | 13.73 |
| 13F | 2.75 | 0 | 11241 | 1.84 |
| 14F | 2.73 | 0 | 9106 | 2.50 |
| 15F | 2.64 | 0 | 7471 | 3.09 |
| 16F | 2.61 | 0 | 5171 | 5.54 |
| 18F | 2.51 | 0 | 3216 | 9.84 |
| 18C | 2.42 | 29.0 | 1760 | 29.25 |
| WET | 2.50 | 10.0 | 5017 | 6.41 |

Two methods were used to measure the fineness of fractionated fly ashes. The first method involved determining the residue on a 45 micron (No. 325) sieve. Using the sieve No. 325 method, the fractionated fly ash samples 3F, 5F, 6F, 10F, 13F, 14F, 15F, 16F and 18F had the same fineness; all of them have zero retention. The second method was the surface area measurement by air permeability test.

It can be noted from Table 3 that the finer the particle size of fractionated fly ashes was, the higher the specific gravity and the Blaine fineness. In general, fly ash of greater fineness had greater specific gravity, in agreement with previous investigation (Hansson, 1989, Symposium Proceedings, Fly Ash and Coal Conversion By-Products: Characterization, Utilization and Disposal V, Material Research Society 136:175-183).

Density of fly ash from different electric generating plants varies from 1.97 to 2.89 g/cm$^3$ but normally ranges between about 2.2 to 2.7 g/cm$^3$ (Lane and Best, 1982, supra). Work done by McLaren and Digiolin (1990, Coal Combustion and By-Product Utilization Seminar, Pittsburgh, p. 15) reported that Class F fly ash had a mean specific gravity value of 2.40. The specific gravity of fractionated fly ashes varies from 2.28 for the coarsest fly ash to 2.54 for the finest fly ash for dry bottom fly ash, and from 2.22 for the coarsest to 2.75 for the finest wet bottom fly ash.

The differences in density between fine-bottom and wet-bottom fly ashes suggest that the very fine particles of wet bottom fly ash are thick-walled, void free, or composed of more dense glasses and crystalline components than dry bottom fly ash (Hemming and Berry, 1986, Symposium Proceedings, Fly Ash and Coal Conversion By-Products: Characterization, Utilization and Disposal II, Material Research Society 65:91-103).

Corrosion Resistance of Fly Ash Mortar

Fractionated fly ashes 6F, 16F, the original feed of dry bottom fly ash (DRY), and wet bottom fly ash (WET) were mixed with cement to form fly ash cement mortar. The mix proportions used are shown in Table 3.

TABLE 3

Mix Proportion of Fly Ash Mortar to Resist Acid Attack

| Sample | Cement | Fly Ash | Sand | W/(C + F) | Type of Fly Ash |
| --- | --- | --- | --- | --- | --- |
| CF | 1.00 | — | 2.75 | 0.50 | — |
| Dry25 | 0.75 | 0.25 | 2.75 | 0.50 | Non-fractionated Dry |
| Wet25 | 0.75 | 0.25 | 2.75 | 0.50 | Non-fractionated Wet |
| 6F25 | 0.75 | 0.25 | 2.75 | 0.50 | 6F |
| 16F25 | 0.75 | 0.25 | 2.75 | 0.50 | 16F |
| Dry50 | 0.50 | 0.50 | 2.75 | 0.50 | Non-Fractionated Dry |
| Wet50 | 0.50 | 0.50 | 2.75 | 0.50 | Non-fractionated Wet |
| 6F50 | 0.50 | 0.50 | 2.75 | 0.50 | 6F |
| 16F50 | 0.50 | 0.50 | 2.75 | 0.50 | 16F |

As can be seen from Table 3, the percentage of fly ash used in the mixes was 25 and 50 percent by weight of cementitious (cement and fly ash) materials. In other words, in this experiment, fly ash replaced cement in cementitious materials. The water to cementitious materials ratio of all mixes was kept constant at 0.5.

Standard 2-inch cubes were cast and cured in saturated lime water about 60 days before being put into the acid bath. Each cube was carefully weighed. Fly ash cement mortar samples and control samples (100% cement, no fly ash, in cementitious materials), were then immersed in a 100 ml/l sulfuric acid ($H_2SO_4$) bath. All samples were kept under the same corrosive environment until the testing date. To evaluate the extent of the damage caused by acid attack, the samples were removed from the acid bath and washed with tap water. The samples were then weighed at the saturated surface dry condition. The weight loss was then determined by comparison with the weight of the original sample recorded earlier.

Results and Discussion

Sample designated "CF" is the control mix which contains no fly ash in the mix. The number "25" and "50" stand for the percentage of cement replaced by fly ash.

The weights of sample at different age after being submerged in the concentrated 100 ml/l of $H_2SO_4$ solution are tabulated in Table 4. The compressive strengths of fly ash mortars prior to being immersed in $H_2SO_4$ solution are also presented in Table 4.

TABLE 4

Effect of Fly Ash Cement Mortar in H$_2$SO$_4$ 100 ml/l

| Sample No. | Weight at Different Ages (g) | | | | | | | Comp (psi) |
|---|---|---|---|---|---|---|---|---|
| | 0-day | 1-day | 3-day | 7-day | 14-day | 21-day | 30-day | |
| CF | 301.7 | 289.3. | 262.2 | 206.5 | 139.5 | 100.1 | 69.9 | 9972 |
| DRY25 | 297.1 | 287.0 | 263.0 | 212.7 | 166.5 | 125.5 | 92.7 | 9121 |
| WET25 | 297.8 | 286.8 | 260.7 | 212.3 | 164.6 | 122.1 | 89.3 | 9250 |
| 6F25 | 299.6 | 287.6 | 260.3 | 208.6 | 153.4 | 110.6 | 79.2 | 9415 |
| 16F25 | 297.0 | 284.6 | 255.5 | 197.7 | 135.4 | 90.6 | 60.9 | 9311 |
| DRY50 | 295.8 | 295.4 | 293.6 | 289.5 | 280.1 | 276.8 | 257.8 | 5435 |
| WET50 | 291.9 | 291.8 | 291.3 | 291.1 | 291.3 | 276.8 | 233.5 | 6535 |
| 6F50 | 294.8 | 297.7 | 294.8 | 293.6 | 294.3 | 292.6 | 287.2 | 5560 |
| 16F50 | 298.3 | 298.2 | 298.0 | 298.2 | 298.5 | 290.8 | 269.3 | 6487 |

For the control sample containing cement and no fly ash, the corrosion due to acid attack is alarming. The weight losses of the control sample was 30% at 7 days and 67% at 21 days. Such rapid deterioration of cement mortar is alarming. The data indicate that the free lime or calcium hydroxide in the cement control sample is extremely vulnerable to the acid attack.

Figure 2:
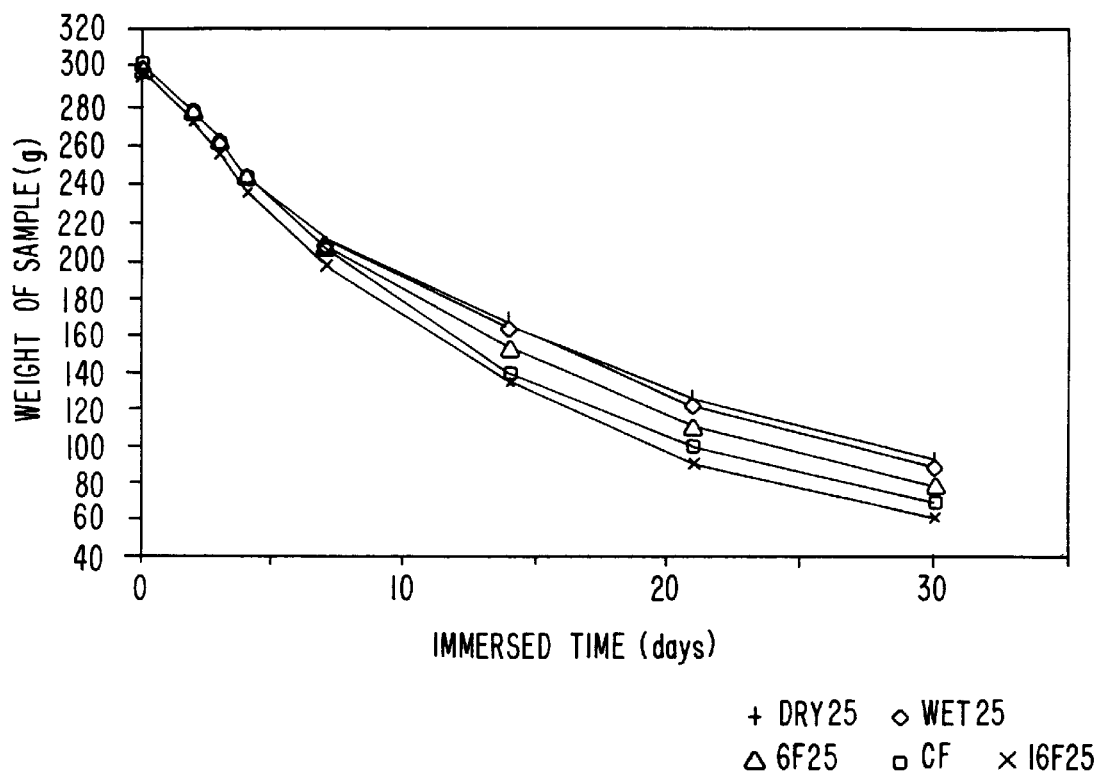
FIG. 2 is a graph showing the relationship between the weight of fly ash mortar samples and immersion time in a 100 ml/l $H_2SO_4$ bath for samples containing 25% fly ash in cementitious materials. Plus sign—non-fractionated dry bottom fly ash; open diamond—non-fractionated wet bottom fly ash; open triangle—fractionated dry bottom fly ash sample 6F; open square—control sample (no fly ash); X—fractionated dry bottom fly ash sample 16F25.

Substitution of fly ash for cement may "tie up" free calcium hydroxide compounds and prevent them from sulfuric acid attack. The results presented in Table 4 indicate that the 25% fly ash mortar samples were vulnerable to acid degradation, but slightly less than control sample. Partial protection from acid attack was observed regardless of the type of fly ash or its particle size (FIG. 2).

Figure 3:
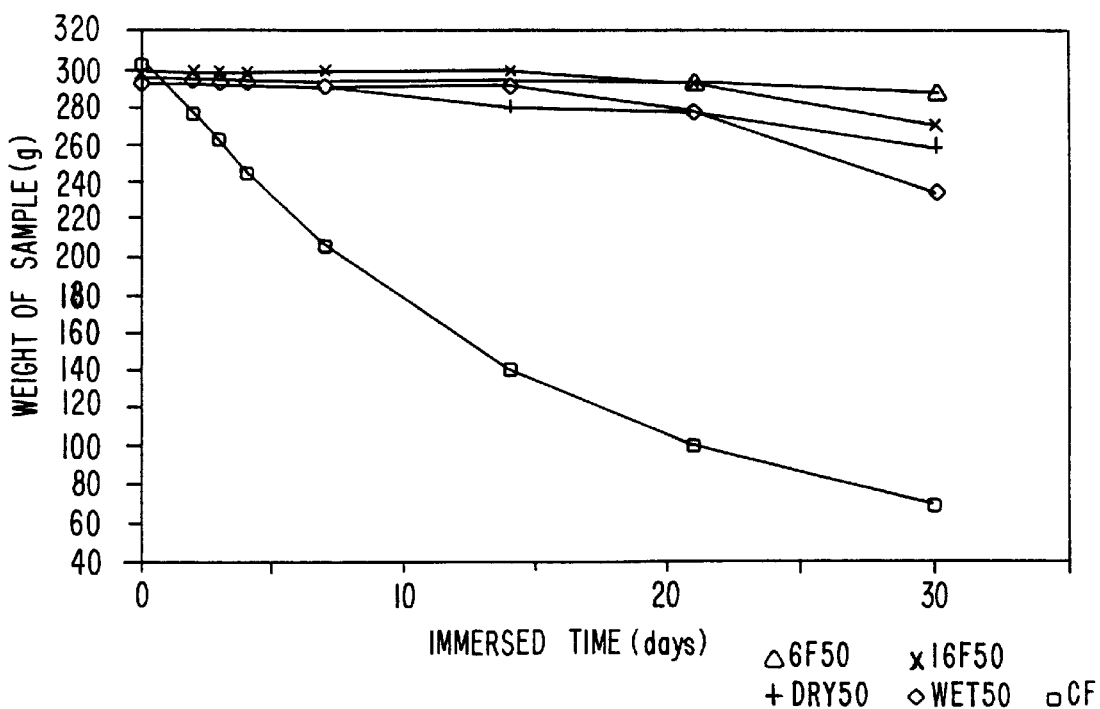
FIG. 3 is a graph showing the relationship between the weight of fly ash mortar samples and immersion time in a 100 ml/l $H_2SO_4$ bath for samples containing 50% fly ash in cementitious materials. Symbols used are the same as for FIG. 3.

When 50% of cement is substituted with fly ash in mortar, the extent of weight loss was significantly reduced. After 7 days, there was no measurable weight loss; weight loss was limited to 6% after 21 days. With this degree of replacement, type of fly ash and its particle size had no significant effect on the corrosion resistance of fly ash mortar (FIG. 3).

Figure 4:
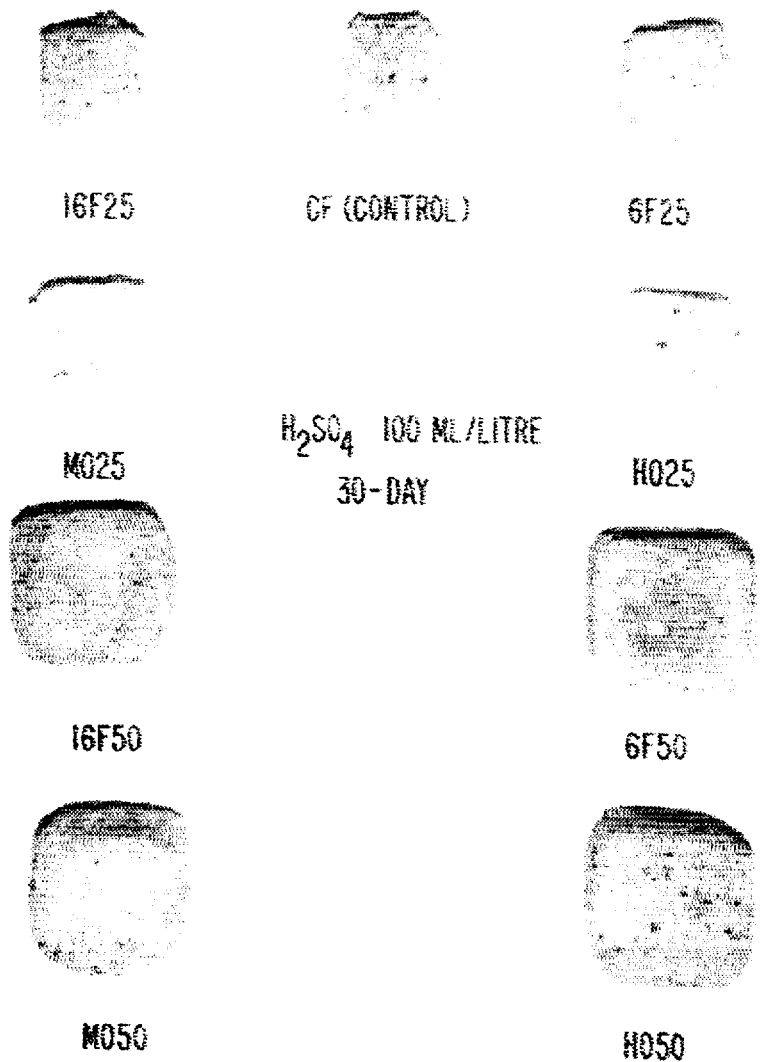
FIG. 4 is a photograph of samples that had been immersed in a 100 ml/l $H_2SO_4$ bath for 30 days. It is evident that the control (CF) and 20% fly ash replacement samples (16F25, 6F25, MO25, and HO25) were severely corroded by the treatment, but that the 50% replacement samples (16F50, 6F50, MO50, and HO50) were relatively unaffected.

After 30 days, particle size of fly ash demonstrates an effect on the corrosion resistance (FIG. 4). The non-fractionated fly ash seemed to sustain more damage than the fractionated 15-micron ash samples (6FC50 and 16FC50).

FIG. 4 shows the remains of the fly ash mortar samples after being immersed in the H$_2$SO$_4$ for 30 days. Control and fly ash mortar samples with 25% replacement of cement with fly ash in the mix show severe weight loss after treatment in the 100 ml/l H$_2$SO$_4$ solution. With 50 percent fly ash in the mix, the mortar sample is much more resistant to acid attack than is the control and the 25 percent fly ash cement samples.

In terms of compressive strength, the samples with 25% cement replacement gave a higher compressive strength than the 50% one. Based on the compressive strength, the samples can be divided into 2 groups. First is the control and the 25% fly ash samples, which demonstrate values of compressive strength more than 9000 psi. The second group consists of the 50% fly ash mortar samples, which have strength between about 5000 to 6500 psi.

Figure 5:
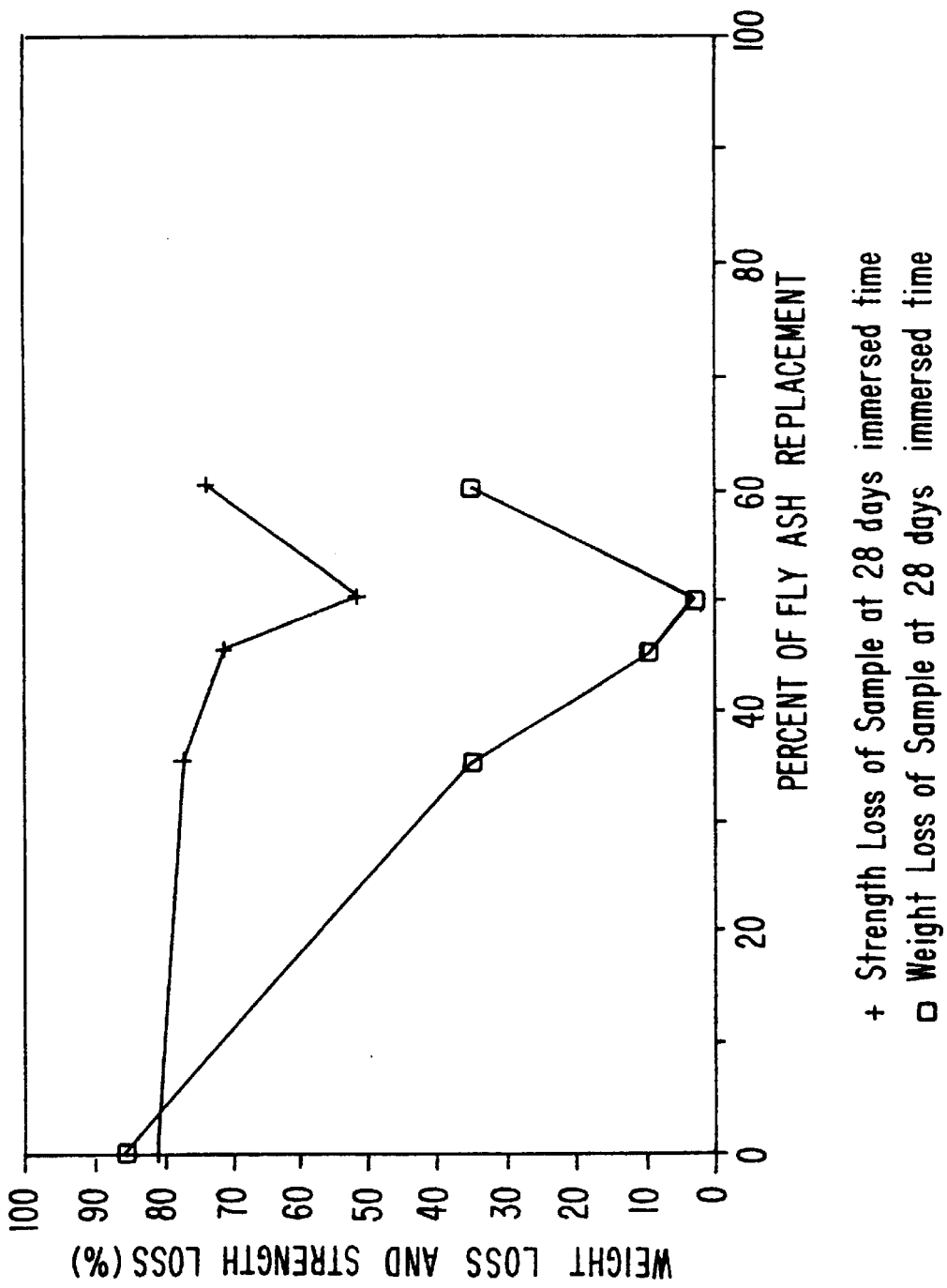
FIG. 5 is a graph showing weight loss and compressive strength loss of mortar samples containing varying percentages of fly ash as cementitious materials after acid bath treatment for 28 days. The data demonstrate that the optimum ratio of fly ash to cement for acid and sulfate resistance is 1:1. This ratio had the least weight loss and least compressive strength loss of all samples tested.

The weight loss and compressive strength loss of mortar samples containing varying amounts of fly ash that replaces cement is shown in FIG. 5. This graph demonstrates a clear maximum of protection from sulfuric acid attack when 50% of the cement is replaced with fly ash, i.e., the amount of fly ash present is about the same as the amount of cement present in the mortar. The results further show that the maximum corrosion resistance is achieved when the ratio of cement to fly ash is 1:1 in a mortar, or cement, composition. Higher or lower amounts of fly ash lead to increased weight loss and loss of compressive strength from acid attack.

Clearly, compressive strength of a sample is not an accurate determinant of acid resistance; rather, it is the amount of fly ash-in the mix that governs the resistance. These data indicate that the limit of fly ash content of cementitious materials, i.e., the maximum replacement of cement with fly ash, to provide corrosion resistance against acid attack while maintaining an acceptable compressive strength, is about 35%.

The present invention is not to be limited in scope by the specific embodiments describe herein. Indeed, various modifications of the invention in addition to those described herein will become apparent to those skilled in the art from the foregoing description and the accompanying figures. Such modifications are intended to fall within the scope of the appended claims. Various publications are cited herein, the disclosures of which are incorporated by reference in their entireties.

What is claimed is:

1. A hardenable mixture comprising cementitious materials, fly ash, and a fine aggregate, wherein the cementitious materials comprise fly ash as well as cement; and wherein the total amount of fly ash ranges from about 60% to about 120% of the total amount of cement in the hardenable mixture, by weight, wherein the fly ash is characterized by at least 99% of the particles having a particle size less than 20 microns and having a fineness modulus of less than about 600, wherein the fineness modulus is calculated as the sum of the percent of fly ash particles having a size greater than 0, 1, 1.5, 2, 3, 5, 10, 20, 45, 75, 150, and 300 microns.

2. The hardenable mixture of claim 1, wherein the cementitious materials comprise from about 5% to about 35% fly ash, and the fine aggregate comprises sand and fly ash.

3. The hardenable mixture of claim 2, wherein the cementitious material comprise about 25% fly ash, and the total amount of fly ash in the mixture is about 100% of the total amount of cement, by weight.

4. The hardenable mixture of claim 1, wherein the total amount of fly ash present in the mixture is about 70% to about 110% of the total amount of cement by weight.

5. The hardenable mixture of claim 4, wherein the total amount of fly ash present in the mixture is about the same as the total amount of cement; by weight.

6. The hardenable mixture of claim 1, wherein the fly ash is wet bottom fly ash having fineness modulus of less than about 350.

7. A concrete consisting of about 1 part by weight cementitious materials, about 1 to about 3 parts by weight fine aggregate comprising sand and fly ash, about 1 to about 5 parts by weight coarse aggregate, and about 0.28 to about 0.6 parts by weight water, wherein the cementitious materials comprise from about 0% to about 60% by weight fly ash and from about 40% to about 100% cement, and wherein the total amount of fly ash ranges from about 25% to about 150% of the total amount of cement, by weight, wherein the fly ash is characterized by at least 99% of the particles having a particle size less than 20 microns and having a fineness modulus of less than about 600, wherein the fineness modulus is calculated as the sum of the percent of fly ash particles having a size greater than 0, 1, 1, 5, 2, 3, 5, 10, 20, 45, 75, 150, and 300 microns.

8. The concrete of claim 7, wherein the cementitious materials comprise from about 5% to about 35% fly ash.

9. The concrete of claim 8 wherein the cementitious material comprise about 25% fly ash, and the total amount of fly ash in the concrete is about 100% of the total amount of cement, by weight.

10. The concrete of claim 7, wherein the total amount of fly ash present in the concrete is about 70% to about 110% of the total amount of cement, by weight.

11. The concrete of claim 10 wherein the total amount of fly ash present in the concrete is about the same as the total amount of cement, by weight.

12. The concrete of claim 7, wherein the fly ash is wet bottom fly ash having a fineness modulus of less than about 350.

13. A mortar consisting of about 1 part by weight cementitious materials, about 1 to about 3 parts by weight fine aggregate comprising sand and fly ash, and about 0.28 to about 0.6 parts by weight water, wherein the cementitious materials comprise from about 0% to about 60% by weight fly ash and about 40% to about 100% by weight cement; and wherein the total amount of fly ash is about 25% to about 150% of the total amount of cement by weight, wherein the fly ash is characterized by at least 99% of the particles having a particle size less than 20 microns and having a fineness modulus of less than about 600, wherein the fineness modulus is calculated as the sum of the percent of fly ash particles having a size greater than 0, 1, 1.5, 2, 3, 5, 10, 20, 45, 75, 150, and 300 microns.

14. The mortar of claim 13, wherein the cementitious materials comprise from about 5% to about 35% fly ash.

15. The mortar of claim 14, wherein the cementitious material comprise about 25% fly ash, and the total amount of fly ash in the mortar is about 100% of the total amount of cement, by weight.

16. The mortar of claim 13, wherein the total amount of fly ash present in the mortar is about 70% to about 110% of the total amount of cement, by weight.

17. The mortar of claim 16, wherein the total amount of fly ash present in the mortar is about the same as the total amount of cement, by weight.

18. The mortar of claim 13, wherein the fly ash is wet bottom fly ash having a fineness modulus of less than about 350.

* * * * *